United States Patent
Warren

(10) Patent No.: US 8,316,892 B2
(45) Date of Patent: Nov. 27, 2012

(54) LATERAL LINER WITH SEAL

(75) Inventor: Darcy Warren, Essex (CA)

(73) Assignee: Liqui-Force Sewer Services Inc., Kingsville, Ontario (CA)

( * ) Notice: Subject to any disclaimer, the term of this patent is extended or adjusted under 35 U.S.C. 154(b) by 645 days.

(21) Appl. No.: 12/062,082

(22) Filed: Apr. 3, 2008

(65) Prior Publication Data

US 2008/0245433 A1  Oct. 9, 2008

Related U.S. Application Data

(60) Provisional application No. 60/909,747, filed on Apr. 3, 2007, provisional application No. 60/953,571, filed on Aug. 2, 2007.

(51) Int. Cl.
*F16L 55/16* (2006.01)

(52) U.S. Cl. ....... 138/98; 138/97; 405/150.1; 405/184.2

(58) Field of Classification Search .................. 138/97, 138/98; 405/150.1, 184.2
See application file for complete search history.

(56) References Cited

U.S. PATENT DOCUMENTS

| | | |
|---|---|---|
| 3,968,552 A | 7/1976 | Hunter |
| 4,434,115 A | 2/1984 | Chick |
| 4,893,389 A | 1/1990 | Allen et al. |
| 4,995,761 A | 2/1991 | Barton |
| 5,108,533 A | 4/1992 | Long, Jr. et al. |
| 5,167,258 A | 12/1992 | Rice |
| 5,340,160 A * | 8/1994 | Meijers et al. ............ 285/15 |
| 5,393,481 A | 2/1995 | Wood |
| 5,451,284 A | 9/1995 | Ikeda et al. |
| 5,454,401 A | 10/1995 | Kamiyama et al. |
| 5,498,389 A | 3/1996 | Kamiyama et al. |
| 5,520,484 A | 5/1996 | Kamiyama et al. |
| 5,566,719 A | 10/1996 | Kamiyama et al. |
| 5,598,873 A | 2/1997 | Kamiyama et al. |
| 5,609,439 A | 3/1997 | Schreiner et al. |
| 5,624,629 A | 4/1997 | Wood |
| 5,765,597 A * | 6/1998 | Kiest et al. ............. 138/98 |
| 5,915,419 A * | 6/1999 | Tweedie et al. .......... 138/98 |
| 5,927,341 A | 7/1999 | Taylor |
| 5,944,058 A | 8/1999 | Kamiyama et al. |
| 5,950,682 A | 9/1999 | Kiest, Jr. |
| 5,971,032 A | 10/1999 | Ward |
| 6,001,212 A | 12/1999 | Polivka et al. |
| 6,006,787 A * | 12/1999 | Kamiyama et al. ....... 138/98 |
| 6,029,726 A | 2/2000 | Tweedie et al. |
| 6,044,867 A | 4/2000 | Tweedie et al. |
| 6,068,725 A * | 5/2000 | Tweedie et al. ........ 156/287 |
| 6,085,794 A | 7/2000 | Kamiyama et al. |
| 6,093,363 A | 7/2000 | Polivka |
| 6,096,363 A | 8/2000 | van Lengerich |
| 6,105,619 A * | 8/2000 | Kiest, Jr. ................ 138/98 |
| 6,152,184 A | 11/2000 | Kamiyama et al. |
| 6,158,473 A * | 12/2000 | Kamiyama et al. ....... 138/98 |

(Continued)

*Primary Examiner* — James Hook

(74) *Attorney, Agent, or Firm* — Carlson, Gaskey & Olds, P.C.

(57) ABSTRACT

A lateral liner assembly provides for sealing of the junction between a lateral sewer line and a main sewer pipe. The lateral liner assembly includes a body portion attached to a collar portion. A flange assembly is secured to the collar to provide a rigid base for a seal. The seal supported on the flange seals against the inner surface of the main sewer pipe. The seal provides a desired water tight seal for the junction between the main sewer line and the lateral sewer line.

28 Claims, 6 Drawing Sheets

U.S. PATENT DOCUMENTS

| | | |
|---|---|---|
| 6,337,114 B1 | 1/2002 | Wood et al. |
| 6,484,757 B1 | 11/2002 | Warren |
| 6,487,679 B1 | 11/2002 | Arimilli et al. |
| 6,688,337 B2 * | 2/2004 | Ward .............................. 138/98 |
| 6,695,013 B2 | 2/2004 | Warren |
| 6,994,118 B2 * | 2/2006 | Kiest et al. ...................... 138/98 |
| 7,121,305 B2 * | 10/2006 | Kaneta et al. ................... 138/98 |
| 7,975,726 B2 * | 7/2011 | Kiest, Jr. ......................... 138/98 |
| 2003/0116211 A1 * | 6/2003 | Ward .............................. 138/98 |
| 2005/0121092 A1 * | 6/2005 | Kiest et al. ...................... 138/98 |
| 2009/0056823 A1 * | 3/2009 | Kiest, Jr. ......................... 138/98 |
| 2011/0203719 A1 * | 8/2011 | Kiest, Jr. ......................... 156/94 |
| 2011/0259461 A1 * | 10/2011 | Kiest, Jr. ......................... 138/97 |
| 2011/0277864 A1 * | 11/2011 | Kiest, Jr. ......................... 138/98 |
| 2011/0290359 A1 * | 12/2011 | Kiest, Jr. ......................... 138/98 |
| 2012/0204989 A1 * | 8/2012 | Kiest, Jr. ......................... 138/97 |

* cited by examiner

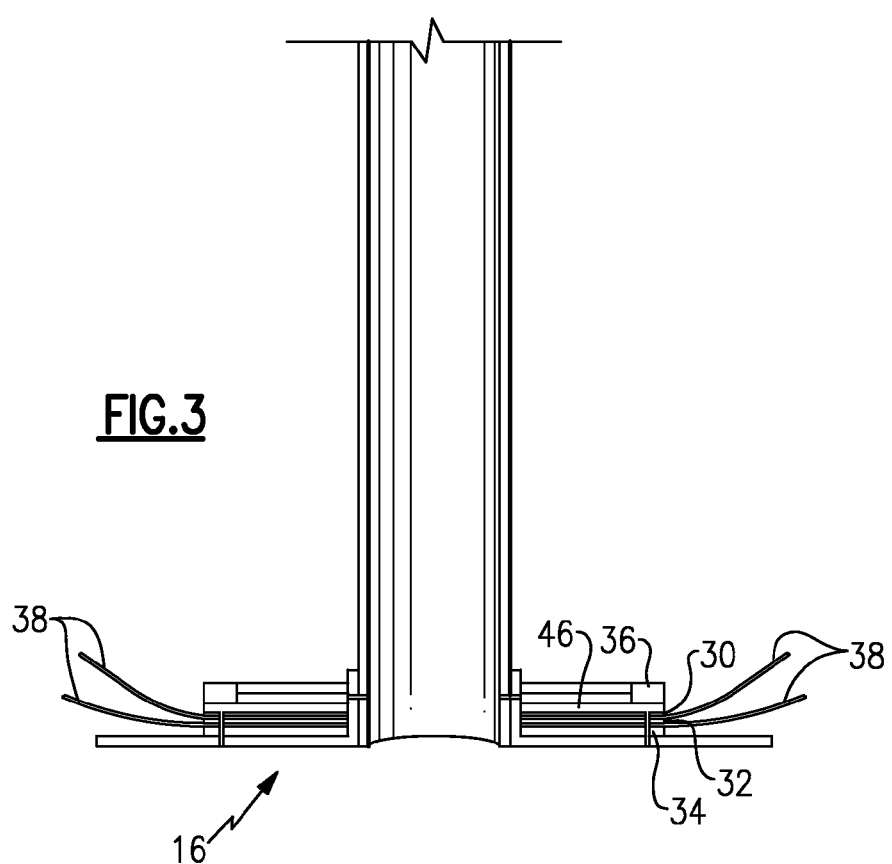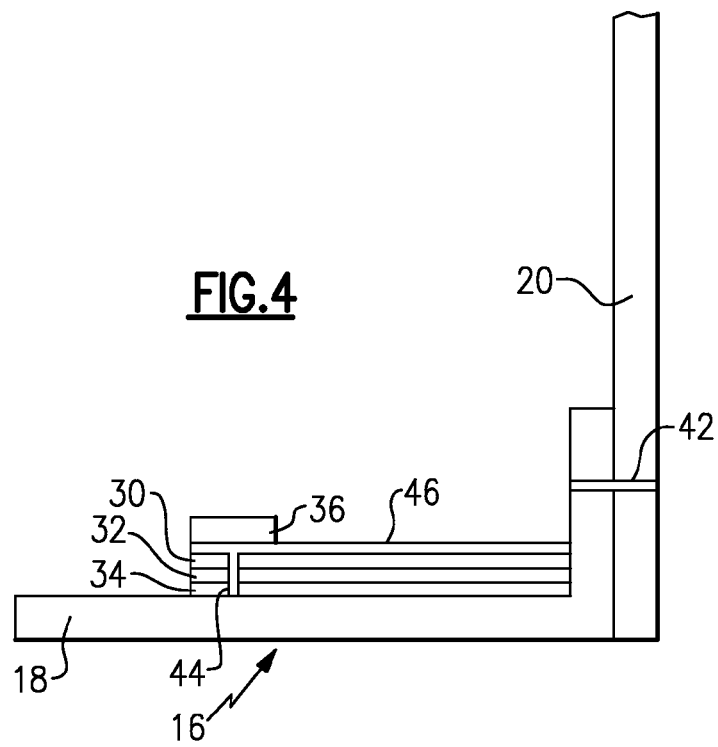

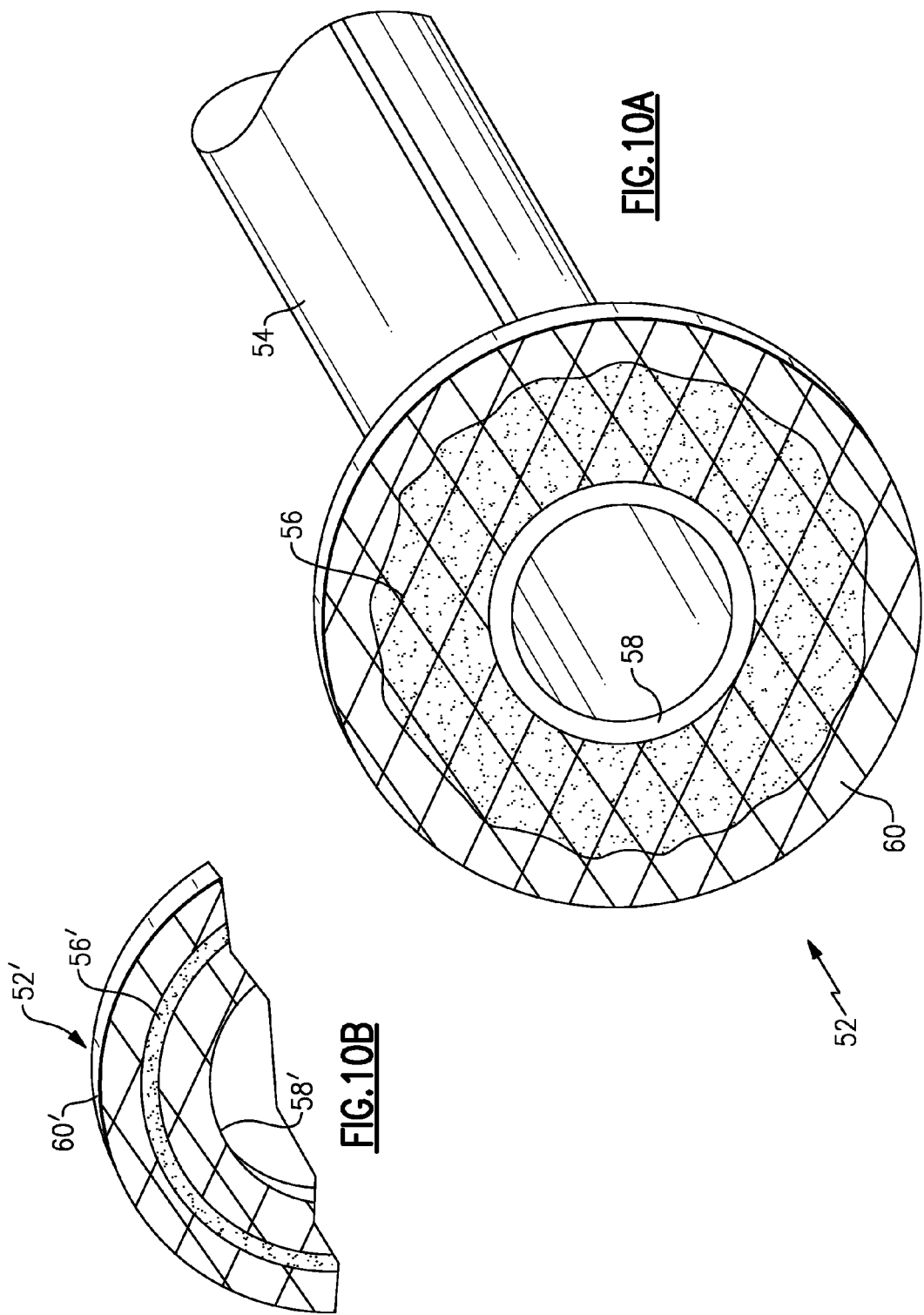

LATERAL LINER WITH SEAL

CROSS REFERENCE TO RELATED APPLICATION

The application claims priority to U.S. Provisional Application Nos. 60/909,747 filed on Apr. 3, 2007 and 60/953,571 filed on Aug. 2, 2007.

BACKGROUND OF THE INVENTION

This invention generally relates to a device for repairing a junction between a lateral and main line. More particularly, this invention relates to a liner for improving junction repair sewer liner performance.

A known method of repairing an existing sewer pipe without excavation includes lining an existing sewer pipe with a resin impregnated felt liner. The resin impregnated felt liner is installed within the sewer pipe and held against the walls of the existing pipe until cured. During the curing process, it is desired that the resin adhere to the inner surface of the sewer pipe to provide the desired seal.

This cured liner substantially replaces the existing sewer by providing a new pipe within the existing old pipe. Repair of a junction between a main sewer pipe and a lateral sewer pipe includes a mainline liner portion and a lateral liner portion. In such installations it is desired to provide a seal. The seal of conventional liners depends on adhesion between the resin impregnated felt liner and the inner surface of the sewer pipe.

Disadvantageously, adhesion between the liner and the existing sewer pipe is not as complete as desired. Further, the curing process generates some shrinkage of the liner that also detracts from the desired seal.

Accordingly, it is desirable to develop a cured in place pipe liner repair that provides a desired seal between an existing sewer pipe and a liner that does not rely on adhesion between the existing sewer pipe and the cured in place felt liner.

SUMMARY OF THE INVENTION

A disclosed example lateral liner assembly provides for sealing of the junction between a lateral sewer line and a main sewer pipe.

The lateral liner assembly includes a body portion attached to a collar portion. A flange assembly is secured to the collar to provide a rigid base for a seal. The seal supported on the flange seals against the inner surface of the main sewer pipe. The seal provides a desired water tight seal for the junction between the main sewer line and the lateral sewer line.

These and other features of the present invention can be best understood from the following specification and drawings, the following of which is a brief description.

BRIEF DESCRIPTION OF THE DRAWINGS

FIG. 3 is a cross-sectional view of the example lateral liner assembly.

FIG. 4 is an enlarged cross-sectional view of a portion of the example lateral liner assembly.

FIG. 10A is a perspective view of another flange portion of another example lateral liner.

FIG. 10B is a perspective view of the flange portion with another seal assembly.

DETAILED DESCRIPTION OF AN EXAMPLE EMBODIMENT

Figure 1:
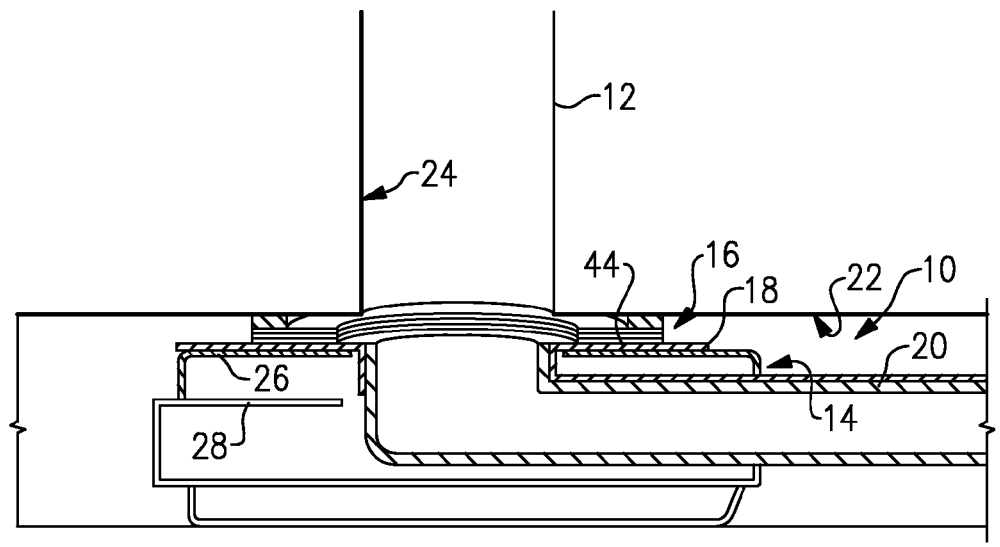
FIG. 1 is a schematic view of an installation system for installing a lateral junction pipe liner.

Referring to FIG. 1, a main sewer line 10 includes a junction with a lateral line 12. The example lateral liner assembly 14 provides for sealing of the junction between the lateral sewer line 12 and the main sewer pipe 10. The lateral liner assembly 14 includes a body portion 20 attached to a collar portion 18. The collar portion 18 includes a flange assembly 16.

The liner assembly 20 is assembled and installed from the main sewer line 10 into the lateral sewer line 12. A carrier 28 supports the lateral liner assembly 20 during installation. An inflatable bladder 26 attached to the carrier assembly 28 is inflated to push the collar 18 against an inner surface 22 in the main sewer line 10. Upon inflation and securement of the collar portion 18 of the lateral liner assembly 14 against the inner surface 22 of the main sewer line 10, the body portion 20 is inverted into the lateral sewer pipe 12 by techniques known to those skilled in the art.

The flange assembly 16 is secured to the collar 18 by way of a stitch 44 and includes a gasket 36 that seals against the inner surface 22 of the main sewer pipe 10. This gasket 36 provides the desired water tight seal for the junction between the main sewer line 10 and the lateral sewer line 12.

Figure 2:
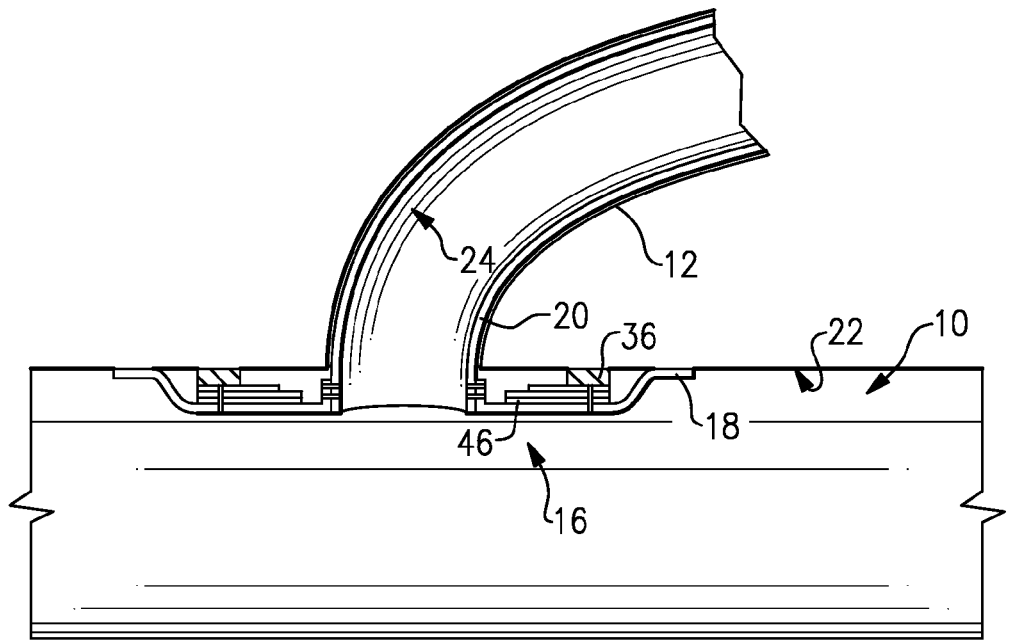
FIG. 2 is a schematic side view of a lateral liner installed to repair the junction between a main and a lateral sewer liner.

Referring to FIG. 2, the example lateral liner assembly 14 is illustrated in the installed condition. In the installed condition, the collar 18 holds the seal 36 against the inner surface 24 of the main sewer pipe 10. The body portion 20 of the lateral liner assembly 14 is disposed within the lateral sewer pipe 12. Air pressure provided by the bladder 26 (FIG. 1), pushes the tube 20 against the inner surfaces of the lateral sewer line 12. In this example, the body portion 20 is pushed against an inner surface 24 of the lateral sewer line 12.

The gasket 36 is pushed and held against the inner surface 22 of the main sewer pipe 10 by the rigid parts of the flange assembly 16. The flange assembly 16 provides a rigid member held against the inner surface 22 of the main sewer line 10 to maintain a desired pressure on the gasket 36 that provides the desired sealing of the lateral junction.

Both the collar 18 and tube 20 are comprised of a felt material impregnated with a resin that cures in place during installation. The resin soaked collar 18 and tube 20 are inverted into the position illustrated in FIG. 2. The bladder assembly 26 maintains pressure on the tube portion 20 against the inner surface of the lateral sewer pipe 12. The bladder assembly 26 also pushes against the collar portion 18 such that the gasket 36 is held and compressed against the inner surface of the main sewer pipe 10. Once the resin cures, the collar 18 and the tube 20 form a substantially rigid and cured in place pipe.

The gasket 36 is a hydrophilic gasket meaning that it expands in the presence of moisture and water. The example flange assembly 16 includes flexible layers of fiberglass surrounding a middle rigid fiberglass. The rigid layer provides a base onto which the hydrophilic gasket 36 is adhered. Although the example includes several flexible layers, one or many layers could also be utilized to provide the desired rigidity of the flange assembly 16.

Referring to FIG. 3, the flange assembly 16 includes first, second and third layers 30, 32, 34 of fiberglass sheeting that are attached to the collar portion 18 by stitches 44. A rigid layer 46 is disposed atop the fiberglass layers 30, 32, 34 and is bonded by way of adhesive to the layer 30 of the fiberglass sheeting. During the resin-impregnated process resin is drawn through the resin-impregnated material to impregnate the flexible fiberglass layers 30, 32. Leads 38 are disposed between the layers 30, 32, 34 in order to provide a means of drawing resin through and into each of the fiberglass layers 30, 32, 34.

Referring to FIG. 4, an enlarged view of a single side of the flange assembly 16 is shown and includes the resin-impregnatable collar portion 18 that is attached to the tube portion by the stitch 42. The first, second and third layers of the fiberglass sheet 30,32,34 are in turn stitched to the collar 18 by way of stitches 44. The first and third layers 30, 34 begin as substantially flexible layers of fiberglass sheet. The middle layer 32 begins as a substantially rigid layer of fiberglass sheeting. Each of the layers of fiberglass sheeting are stitched and attached to the collar portion 18. Disposed on top of the layers of fiberglass sheeting 30, 32, 34 is the rigid layer 46. The rigid layer 46 comprises a neoprene rubber material. The neoprene rubber material 46 is bonded by way of an adhesive to the fiberglass layer 30.

During preparation for installation, resin is drawn through the resin-impregnatable material that comprises the tube 20 and the collar 18 into and between the fiberglass layers 30, 32, 34. In this way, the flexible layers 30, 34 are impregnated with a resin material. During the curing process, the tube 20, collar 18 cure and harden along with the fiberglass sheeting of the layers 30, 32, 34. In this way the flange assembly 16 becomes a substantially rigid member that provides support for the gasket 36. The gasket 36 is in turn bonded to the rigid layer 46 through an adhesive bond.

Referring to FIG. 2 with continuing reference to FIG. 4 the flange assembly 16 comprises the fiberglass layers 30, 32, 34 that are impregnated with a curable resin. Once that resin is hardened, the fiberglass layers 30, 32, 34 become a substantially rigid member that maintains a desired pressure on the gasket 36. Pressure exerted by the flange assembly 16 collapses the gasket 36 a desired amount to maintain the desired seal against the inner surface 22 of the main sewer pipe 10. This pressure by the flange assembly 16 on the gasket 36 ensures that the desired seal around the lateral junction is maintained.

Figure 5:
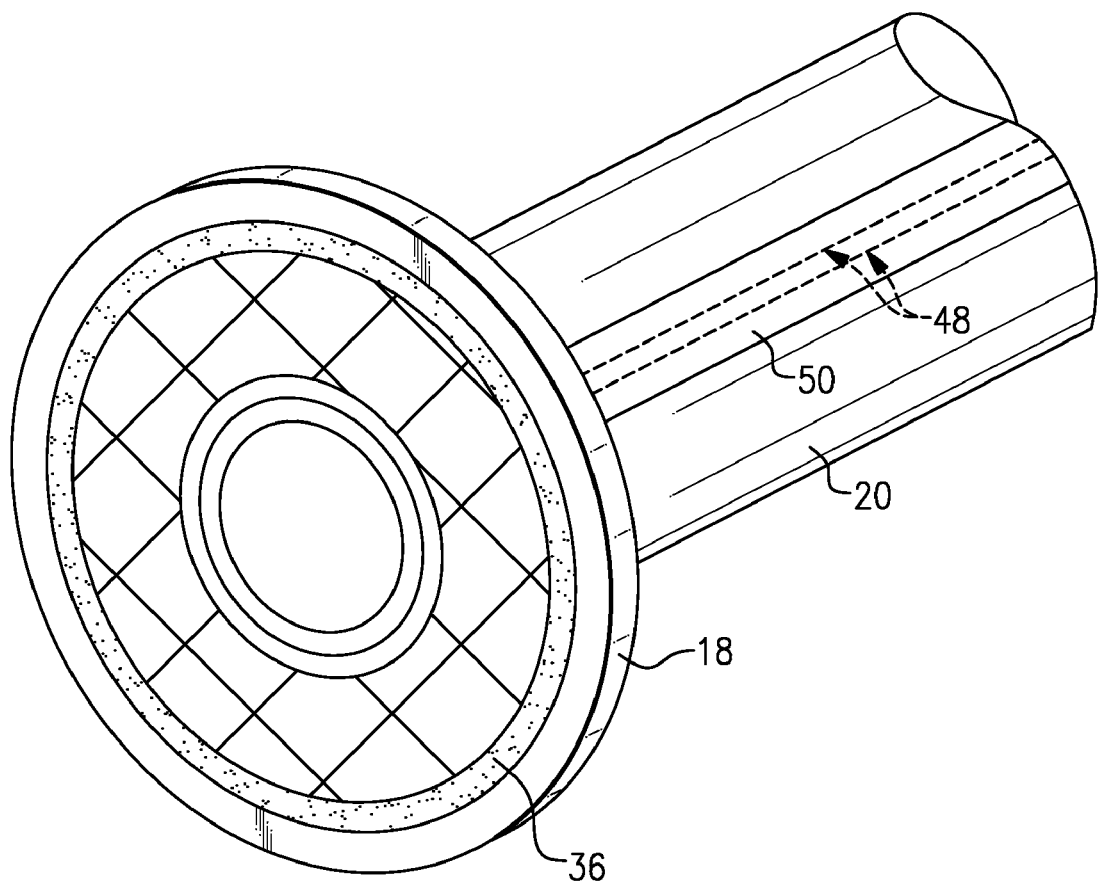
FIG. 5 is a perspective view of a flange portion of the example lateral liner assembly.

Referring to FIG. 5, a bottom view of the example flange assembly is illustrated that shows the example gasket 36 disposed about a circumference of the collar 18. The gasket 36 is spaced inwardly from an outer periphery such that a portion of the collar 18 extends radially outward of the gasket 36. The radially outward portion of the collar 18 is not depended on for the water integrity of the seal and is not necessarily in contact with the main sewer line 10. Instead, the rigid construction of the example flange assembly 16 provides the pressure that is required to hold and force the gasket 36 against the inner surface to provide the desired water tight seal.

Flange assembly and collar 18 are held in place by the tube portion 20. The tube portion 20 extends upwardly into the lateral sewer pipe 12. The lateral sewer pipe 12 includes bends, curves and other discontinuities that prevent the tube portion 20 from sliding out of the lateral sewer pipe 12. These discontinuities effectively lock in place the lateral liner assembly 14 such that the rigid flange assembly 16 can exert the desired pressure to maintain the water tight and nature of the seal.

The tube portion 20 includes stitching 48 to form the desired tubular shape form a flat sheet of resin impregnatable material. Other attachment means such as bonding using adhesives or heat are also within the contemplation of this invention.

Figure 6:
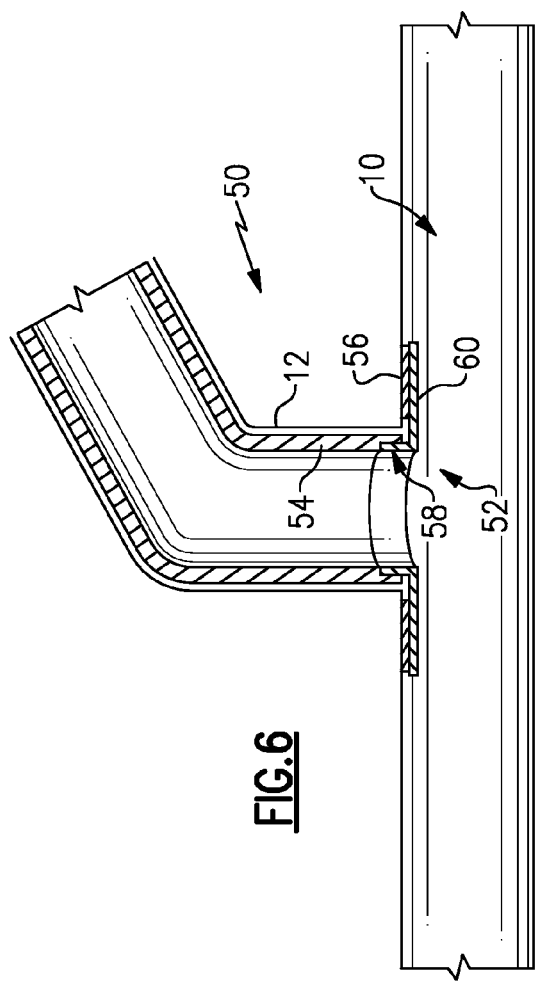
FIG. 6 is a schematic view of a lateral liner installed to repair the junction between a main and a lateral sewer line.

Referring to FIG. 6, another example pipe liner assembly 50 includes a flange assembly 52 that is attached to a body portion 54. A seal material 56 is applied to the flange assembly 52 and butted against an inner surface of the main sewer liner 10. The liner assembly 50 is installed and cured against the inner surfaces of the main line 10 and the lateral liner by inflatable bladders as described above. The main line bladder 16 (FIG. 1) applies a pressure to force the flange assembly 52 against the inner surface of the main sewer line 10. The applied pressure causes the seal material 56 to abut the inner surface of the main sewer liner 10.

The example liner assembly 50 includes the flange assembly 52 that includes a collar portion 58 and a plate portion 60. The collar portion 58 and the plate portion 60 are constructed of a substantially rigid material. This material is different from the material within the body 54. The rigid flange 52 is constructed of a material such as fiberglass reinforced cloth that becomes substantially rigid upon final curing and hardening of the resin. The material for the flange 52 is attached by way of stitching, adhesion or other attachment methods to the body portion 54. The seal material 56 is spread onto the flange portion 52 and abutted against the interior surface of the main sewer liner 10.

Once the resin within the liner assembly 50 has cured a small amount of shrinkage will occur, however, due to the configuration of most lateral pipes including imperfections, bumps, different turns, twist and gaps that are filled by the body of the lateral liner 54, the liner assembly 50 becomes locked within the sewer pipe. Although the liner assembly 50 may not be completely adhered to the walls of the sewer pipe, the cured liner assembly 50 will not move or shift. The various imperfections, turns, gaps and other features specific to that lateral liner lock the lateral liner in place.

The rigid flange assembly 52 maintains pressure on the seal 56 against the inner surface of the main liner 10. The pressure provided by the substantially rigid flange member 56 maintains the seal 56 in place to provide the desired water tight seal between the lateral liner assembly 50 and the inner surface of the sewer pipe.

The flange assembly 52 is essentially a beam for supporting the seal 56 against the inner surface of the main sewer pipe. The locked in place body portion 54 holds the flange assembly 52 in place regardless of any lack of adhesion to the main sewer liner.

Figure 7:
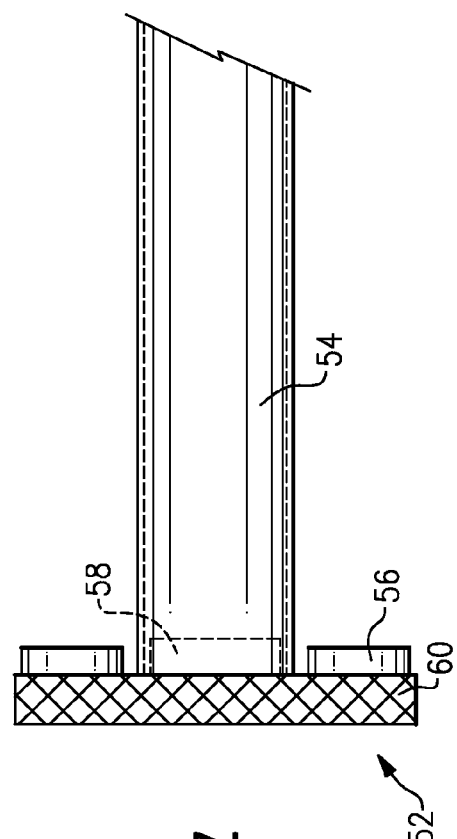
FIG. 7 is a side view of an example lateral lining device.

Referring to FIG. 7, the liner assembly 50 is illustrated in a side view. The flange assembly 52 is formed of a material substantially more rigid than the body portion 54. The substantially rigid material can be utilized in the flange 52 as it is not required to be everted into place as is the body portion 54.

The seal material 56 is preferably a material that includes an elasticity that accommodates any separation between the flange 52 and the inner surface of the main line. Further, the seal 56 is sufficiently durable to maintain the desired seal between the flange 52 and the inner walls of the main sewer liner.

Figure 8:
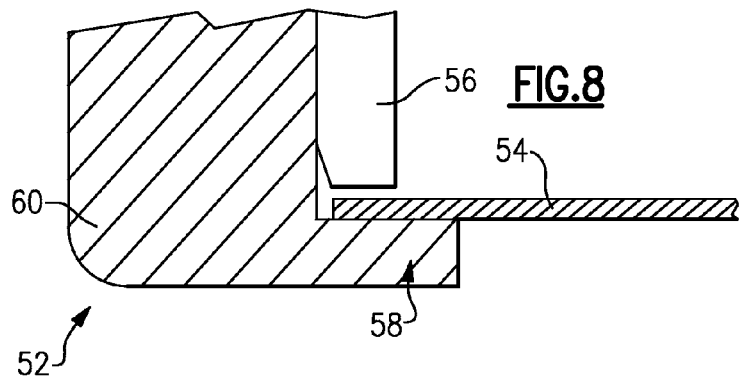
FIG. 8 is an enlarged view of a portion of the example lateral liner.

Referring to FIG. 8, an enlarged view of the example flange 52 is provided at the junction or attachment point with the body liner 54. As is illustrated, the flange 52 is much thicker than the body portion 54.

Figure 9A:
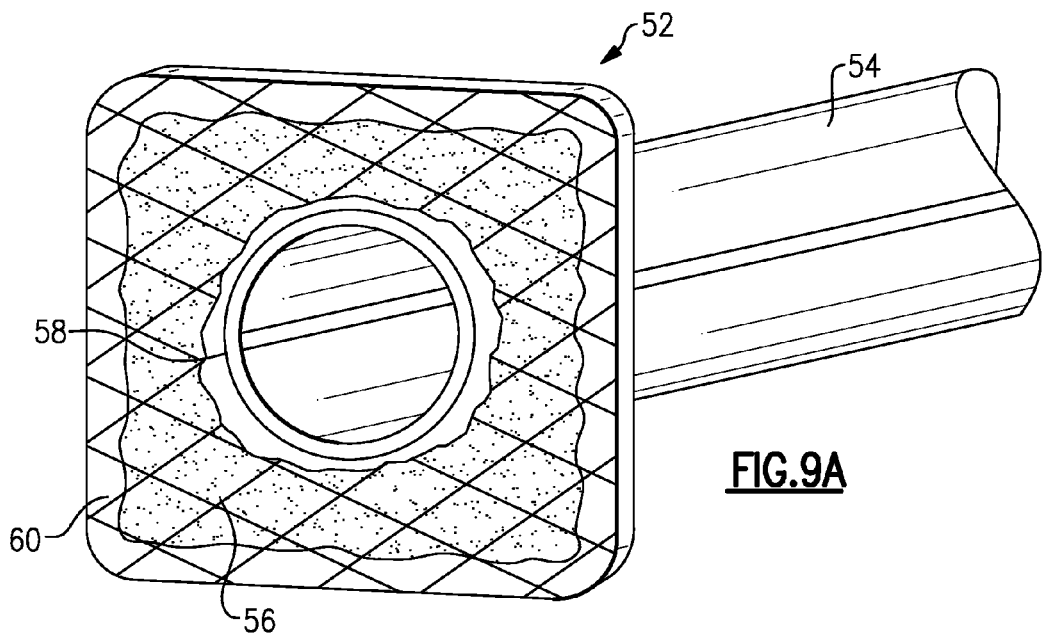
FIG. 9A is a perspective view of a flange portion of the example lateral liner.

FIG. 9A is a view of the side of the flange 52 that abuts the inner surface of the main sewer pipe with the seal material 56 applied. The example flange 52 is substantially rectangular and attached to the body portion 54 at the collar 58. Attachment between the flange 52 and the body portion 54 can be made by any mechanical process or adhesion process. In the example embodiment the collar 58 is stitched to the body 54 to provide a substantially rigid attachment.

Figure 9B:
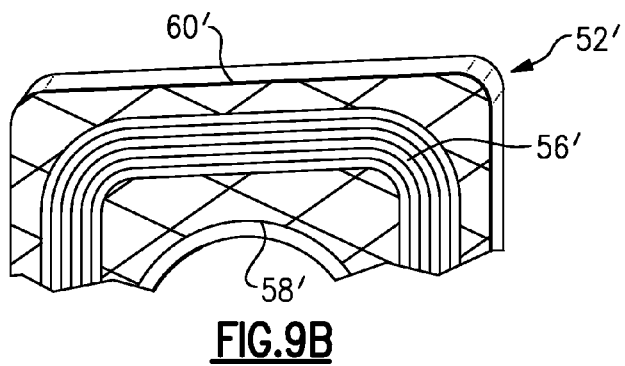
FIG. 9B is a perspective view of another example seal assembly.

Referring to FIG. 9B, another example flange 52' is illustrated including a seal 56'. The seal 56' comprises an elastic gasket instead of the spread on material illustrated in FIG. 9A. As should be understood, that it is within the contemplation of this invention to utilize other seal configurations and materials. The disclosed example seals 56 and 56' are for illustration purposes and other seal materials as are know could also be utilized.

Referring to FIG. 10A, another example flange 52 is circular and includes seal 56. The flange 52 is attached to a body portion 54 by the collar 58. Again attachment of the body portion 54 can be by way of mechanical or adhesion process.

Referring to FIG. 10B, the example flange 52 can also be utilized with a seal assembly 56. The seal assembly 56 is held in place once installed by the rigidity of the flange 52. The seal assembly 56 accommodates any gaps that may occur between the flange 52 and the inner walls of the sewer pipe.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A liner assembly for repairing an existing sewer pipe comprising:
   a body portion comprising a resin impregnatable material for extending into a lateral portion of a sewer pipe;
   a flange assembly supported by the body portion, the flange assembly including a collar portion extending into a main portion of a sewer pipe; and
   a seal attached to the collar portion of the flange assembly for sealing against an inner surface of the main portion of the sewer pipe, wherein the seal comprises a hydrophilic gasket.

2. The assembly as recited in claim 1, wherein the collar portion comprising a resin impregnatable material attached to the body portion.

3. The assembly as recited in claim 1, wherein the flange assembly includes at least one layer of rigid fiberglass sheet.

4. The assembly as recited in claim 3, wherein the flange assembly includes a rubber layer attached to the one or more layers of rigid fiberglass sheet.

5. The assembly as recited in claim 3, wherein the flange assembly includes a flexible layer of fiberglass sheet interspersed between the at least one layer of rigid fiberglass sheet.

6. The assembly as recited in claim 5, wherein the flexible layer of fiberglass sheet absorbs resin from the resin impregnatable body and collar portions.

7. A method of lining a sewer pipe comprising:
   positioning a liner assembly within a sewer pipe, wherein the liner assembly includes a body portion of resin absorbable material and a flange assembly attached to the body portion, the flange assembly including a collar portion for extending around an opening of a lateral portion of the sewer pipe at a junction between the lateral sewer pipe and a main sewer pipe and a hydrophilic gasket secured to the collar portion;
   aligning the collar portion with the opening to the lateral portion of the sewer pipe;
   applying a fluid pressure within the body portion to extend the lateral portion within the lateral portion of the sewer pipe, and holding the body portion against an inner surface of the lateral portion until resin absorbed within the body portion cures; and
   applying a fluid pressure against the collar portion to force the hydrophilic gasket against an inner surface of the main sewer pipe surrounding the opening to the lateral portion until the body portion and the collar portion are cured.

8. The method as recited in claim 7, wherein the body portion and the collar portion comprises a resin absorbable material.

9. The method as recited in claim 8, wherein the flange assembly includes layers of rigid fiberglass interspersed between layers of flexible fiberglass and absorbing some curable resin with the flexible fiberglass layers.

10. The method as recited in claim 7, including supporting the flange assembly about the opening to the lateral portion of the sewer portion with the body portion such that no adhesive bond is formed against the inner surface of the sewer pipe.

11. The method as recited in claim 10, wherein the seal comprises a material expandable responsive to exposure to water.

12. The method as recited in claim 7, including the step of inflating a bladder having a body part and a lateral part to hold the body portion of the lining assembly against in interior surface of the main sewer pipe.

13. The method as recited in claim 12, including the step of inflating the lateral part after inflating the body portion to install the lateral portion of the lining assembly into the lateral sewer pipe.

14. The method as recited in claim 12, including the step of pressing the hydrophilic gasket against an inner surface of the main sewer pipe surrounding the lateral opening with pressure from the main part of the bladder.

15. The method as recited in claim 12, including the step of deflating the bladder after the liner assembly is cured and maintaining sealing contact between the inner surface of the main sewer pipe after removal of pressure against the collar portion.

16. The method as recited in claim 7, wherein the hydrophilic gasket is attached to the collar portion provides an improved seal at the junction between the lateral sewer pipe and the main sewer pipe.

17. A liner assembly for lining a junction between a main sewer pipe and a lateral sewer pipe comprising:
   a lateral portion comprising a flexible resin impregnable material forming a tube;
   a main portion including a resin impregnable material attached to the lateral portion the main portion extending a distance outward from the lateral portion for surrounding an opening in the main sewer pipe for the lateral sewer pipe; and
   a hydrophilic seal supported on one of the lateral and main portions for sealing a junction between the main sewer pipe and the lateral sewer pipe, wherein the hydrophilic seal comprises a gasket supported on the main portion.

18. The liner assembly as recited in claim 17, wherein the main portion includes a central opening about which the lateral portion is attached.

19. The liner assembly as recited in claim 18, wherein the hydrophilic seal is annular and surrounds the opening and the lateral portion.

20. The liner assembly as recited in claim 17, wherein the main portion comprises an annular portion that extends about the lateral portion.

21. The liner assembly as recited in claim 17, wherein an interface between the main portion and lateral portion are flexible for conforming to an irregular shape of the junction between the main sewer pipe and the lateral sewer pipe.

22. The liner assembly as recited in claim 21, wherein the hydrophilic seal is flexible to conform to an irregular shape of the junction between the main sewer pipe and the lateral sewer pipe.

23. The liner assembly as recited in claim 22, wherein the hydrophilic seal is flexible to conform to an irregular inner surface of the main sewer pipe.

24. The liner assembly as recited in claim 17, wherein the hydrophilic seal is supported entirely on the main portion.

25. A liner assembly for lining a junction between a main sewer pipe and a lateral sewer pipe comprising:
a lateral portion comprising a flexible resin impregnable material forming a tube:
a main portion including a resin impregnable material attached to the lateral portion, the main portion extending a distance outward from the lateral portion for surrounding an opening in the main sewer pipe for the lateral sewer pipe; and
a hydrophilic seal supported on one of the lateral and main portions for sealing a junction between the main sewer pipe and the lateral sewer pipe, wherein the main portion comprises a first surface for contacting an inner surface of the main sewer pipe and the hydrophilic seal is supported on the first surface.

26. The liner assembly as recited in claim 25, wherein the first surface includes a first width between an outer edge of the main portion and an interface with the lateral portion with the width being greater than a width of the hydrophilic seal.

27. The liner assembly as recited in claim 26, wherein the first width is greater than at least twice the width of the hydrophilic gasket.

28. The liner assembly as recited in claim 25, wherein the hydrophilic seal is supported entirely on the main portion.

* * * * *